United States Patent [19]
Duddy

[11] 3,839,089
[45] Oct. 1, 1974

[54] WATER ACTIVATED LEAD ACID STORAGE BATTERY CELL HAVING DRY DISCHARGED ELECTRODES

[75] Inventor: Joseph C. Duddy, Trevose, Pa.

[73] Assignee: ESB Incorporated, Philadelphia, Pa.

[22] Filed: May 18, 1973

[21] Appl. No.: 361,565

[52] U.S. Cl. .................................................. 136/26
[51] Int. Cl. ........................................... H01m 39/00
[58] Field of Search .............................. 136/26–27, 136/76, 34, 112–114, 161, 157

[56] References Cited
UNITED STATES PATENTS

| | | | |
|---|---|---|---|
| 3,466,194 | 9/1969 | Duddy | 136/26 |
| 3,607,408 | 9/1971 | Duddy | 136/26 |
| 3,733,220 | 5/1973 | Cortese et al. | 136/26 |

Primary Examiner—Anthony Skapars

[57] ABSTRACT

A lead acid storage battery having dry discharged plates contains a hydrogen ion producing salt within its container. The cell is activated by the addition of water only followed by charging. The presence of the salt prevents the formation of a deleterious corrosion. Preferred salts are the acid sulfates of the alkali metals.

6 Claims, 3 Drawing Figures

TABLE 1 (Dry)

| | $SO_4^=$ | $H^+$ | $Na^+$ equal to $H^+$ |
|---|---|---|---|
| PLATES | 90% | 0% | 0% |
| RESIDUAL ACID | 0.4 | 0.4 | 0 |
| $NaHSO_4$ PELLETS | 9.6 | 4.8 | 4.8 |
| ELECTROLYTE | 0 | 0 | 0 |

TABLE 1 (Dry)

|  | $SO_4^{--}$ | $H^+$ | $Na^+$ equal to $H^+$ |
|---|---|---|---|
| PLATES | 90% | 0% | 0% |
| RESIDUAL ACID | 0.4 | 0.4 | 0 |
| NaHSO$_4$ PELLETS | 9.6 | 4.8 | 4.8 |
| ELECTROLYTE | 0 | 0 | 0 |

TABLE 2 (Water Added)

| PLATES | 90 | 0 | 0 |
|---|---|---|---|
| RESIDUAL ACID | 0 | 0 | 0 |
| NaHSO$_4$ PELLETS | 0 | 0 | 0 |
| ELECTROLYTE | 10 | 5.2 | 4.8 |

TABLE 3 (Charged)

| PLATES | 0 | 0 | 0 |
|---|---|---|---|
| RESIDUAL ACID | 0 | 0 | 0 |
| NaHSO$_4$ PELLETS | 0 | 0 | 0 |
| ELECTROLYTE | 100 | 95.2 | 4.8 |

3,839,089

WATER ACTIVATED LEAD ACID STORAGE BATTERY CELL HAVING DRY DISCHARGED ELECTRODES

FIELD OF THE INVENTION

This invention relates to lead acid storage batteries. In particular, it relates to dry uncharged batteries suitable for activation by the addition of water followed by charging.

BACKGROUND OF THE INVENTION

In the manufacture of lead-acid storage batteries, the positive and negative electrodes are produced by spreading onto grids a paste which contains a lead compound active material comprising mainly PbO (minor quantities of $PbSO_4$ are also present). Frequently a pair of grids are cast with a structural connection between them, and the active material paste is applied to these "twin" grids; at some subsequent step in the assembly of the battery, the connection in the twin pasted grid is broken so that two pasted electrodes result.

After the paste is applied, the electrodes are immersed into sulfuric acid where there is an immediate chemical reaction in the electrodes of both polarity, $PbO + H_2SO_4 \longrightarrow PbSO_4 + H_2O$. The electrodes are then "formed" or "charged," a step in which the $PbSO_4$ is electrochemically converted into a higher oxidation state, $PbO_2$, in the positive electrodes and into a lower oxidation state, Pb, in the negative electrodes. The cell reactions are $2PbSO_4 + 2H_2O \underset{\text{discharge}}{\overset{\text{charge}}{\rightleftarrows}} PbO_2 + Pb + 2H_2SO_4$. After being "formed," the electrodes are dried with one or more washing steps usually preceding the drying.

Another step in the manufacture of the batteries is one in which the electrodes are assembled into elements. An element comprises a plurality of positive electrodes connected together by a positive connecting strap and a plurality of negative electrodes connected together by a negative connecting strap, the positive and negative electrodes being alternately spaced and separated from one another by appropriate separators. The elements are then placed into battery containers. Assembly of the positive and negative electrodes into elements may occur before or after the electrodes are formed.

Storage batteries having dried, charged electrodes have been used for many years. These batteries, which are produced by drying the electrodes after they have been charged in the factory, are shipped without the liquid sulfuric acid electrolyte in them, a feature which saves freight, reduces handling hazards, and contributes to longer shelf life of the batteries. The batteries may be activated just before being placed in service by adding the liquid acid electrolyte; usually the battery is given a short booster charge after the electrolyte has been added.

A long-standing industry objective has been to produce a lead-acid battery having dried electrodes which could be activated by the addition of water rather than sulfuric acid. To achieve this objective, of course, it is necessary to store somewhere inside the battery either concentrated liquid sulfuric acid or some solid or gelatinous sulfate ion containing material which in the presence of water will produce sulfuric acid of sufficient concentration to serve as the battery's electrolyte. One of the difficulties with this general approach, however, is that the space available inside the container is severely limited, and simply increasing the dimensions of the container to increase the storage space for electrolyte progenitors is not always a possible or desirable solution. One of the big efforts of the internal storage approach, then, is to use every available measure of space inside the container.

It has been previously recognized that one location inside a dry battery where sulfate ion precursors might be stored is in the electrodes themselves. As mentioned above, the discharged active material in both the positive and negative electrodes comprises $PbSO_4$. Knowledge of this fact suggests the possibility that a lead-acid type battery having dried electrodes and capable of being activated by the addition of only water could be produced by discharging the electrodes sufficiently during the formation so that they and they alone contain sufficient $PbSO_4$ to produce the required electrolyte upon the addition of water and charging. To achieve the necessary quantity of $PbSO_4$ in the electrodes, it might be necessary to discharge the electrodes to a state of substantially complete discharge. It would be expected that batteries made in this manner would have to be charged after water is added and before the batteries are placed into service.

The present discovery and invention resulted from an attempt to produce batteries having dried, discharged electrodes which could be activated by the addition of water followed by a charging. The events leading to the discovery and invention will be related to provide an understanding.

Mixtures of positive and negative electrode paste were applied to structurally connected grids analogous to the "twin" grids described above. While still in the structurally connected condition and before being assembled into elements, these electrodes were immersed into the sulfuric acid of a formation tank and "formed" or "cycled" for one cycle, the formation ending when the electrodes had been discharged to a state of substantially complete discharge. After being formed, the electrodes were dried, the structurally connected electrodes were sawed apart to produce single, dried, discharged electrodes, and the electrodes were assembled into elements. The positive electrodes were welded to a lead part commonly called a "strap" to form a positive group. The negative electrodes were welded to a second "strap" to form a negative group. The two groups were then intermeshed. Big separators made of a porous material resistant to electrolyte, were placed between each opposing pair of plate surfaces to prevent any metallic contact between the plates. This assembly is often termed a cell element. A suitable number of cell elements were placed into a multi-compartment battery container. Covers were sealed thereon and suitable connections from cell to cell were attached to produce a dry discharged battery suitable for storage for long periods of time.

When an attempt was made to activate the batteries by adding water and charging, an unexpected problem was encountered. It was discovered that the elements would not accept a charge. Close investigation during attempts to activate many batteries in this way led to the observation that crystals of gray materials were being produced which extended from the negative electrodes through and/or around the separators to the positive strap connector. These crystals appeared very soon after water was added and the attempt to charge was begun. Concurrently we observed that a thin film of white material was produced on the surfaces of the postive connecting straps. Pursuing these observations further, it was discovered that the elements would accept the charge if the gray crystals could be prevented from occurring.

SUMMARY OF THE INVENTION

A dry lead acid storage battery cell prepared for activation by the addition of water only, followed by charging, carries the required sulfate ions needed to construct the electrolyte combined in the positive and negative plates principally as lead sulfate. A minor portion of a dry, water soluble acid ion producing material is included within and in an upper portion of the cell. Suitable materials are the acid sulfates, acid sulfites and mono and di hydrogen phosphates of alkali metals; of these, sodium acid sulfate monohydrate is the preferred material.

It is well known that dry formed positive battery plates contain a small quantity of residual free sulfuric acid. However, there is a limit to the amount of sulfuric acid which can safely be allowed to remain in battery plates during a storage period. If too much is permitted to remain, it can corrode or otherwise harm the battery parts. It has also been found that when a storage battery cell of the type described is filled with water, the sulfuric acid contained within the plates does not mix uniformly with the added water. The acid tends to remain near the battery plates and to settle toward the bottom of the cell due to its greater specific gravity when compared to the adjacent water. The solution in the upper portion of the cell is found to be practically pure water. It is now believed that the corrosion and dendrite growth described above is caused by the effect of the charging current acting on lead parts in the presence of a neutral or possibly a basic electrolyte.

By the teaching of the present invention, additional sulfate and hydrogen ions are supplied to the solution within the cell. In a preferred embodiment, the sulfate and hydrogen ions are specifically liberated in the upper portions of the cell. The effect of these ions is to increase the acidity of the solution within the cell so that the lead parts are not soluble or subject to corrosive attack by the action of the electric current needed to charge the cell. The choice of material to use for the ion producing agent is limited. Many materials are harmful to the lead acid couple. Most metal ions act as voltage suppressants to the negative plate whereas many anions cause attack on the positive grid structure. The alkali metal ions on the other hand, particularly sodium and potassium, are inert in the cell reaction and do not harm the cell in any way.

The sulfate ion is a normal constituent of the electrolyte and hence is not an impurity. Suitable salts that are useable for the invention comprise acid sulfates of the alkali metals — lithium, sodium, potassium, rubidium and cesium. Of these, sodium acid sulfate is preferred. The acid sulfates are preferred over the normal sulfate because they are akin to sulfuric acid, are solid materials and also because they are readily soluble in water at most temperatures.

Sodium acid sulfate is found in a hydrated as well as in a non hydrated form. For the purposes of the present invention, the hydrated form, sodium acid sulfate monohydrate has been found to be the better choice. This is because it is more readily soluble in aqueous solutions and because it can be formed into pills by direct compression and without any binder or other additive.

It has also been found that certain other acid salts can be used to acidify the initial electrolyte formed by the addition of water to a dry and discharged battery. Among these are the alkali metal monohydrogen orthophosphates, the alkali metal dihydrogen orthophosphates and the alkali metal acid sulfites. It has been found that these ions in reasonable concentrations such as less than about 10 percent of the sulfate ion, do not have any great effect on the operation of the battery.

A suitable amount of the chosen additive is an amount that will provide from about 1.0 percent to about 10 percent of the hydrogen ion needed in the cell. The remaining acid for the cell is provided by the decomposition of lead sulfate and the ionic action of water in the battery plates due to the action of the charging current along with an amount of about 0.05 percent to about 1.0 percent residual sulfuric acid held within the pores of the discharged battery plates. This residual acid is very difficult to remove in normal processing and, as has been pointed out above, is a desirable means for storing some acid ions.

For convenience, the additive may be prepared in pellet form. The pellets may be prepared by compacting the powdered additive with or without a binder. The pellet size is conveniently made so that a chosen number added to each cell will provide the required additive level.

DESCRIPTION OF THE PREFERRED EMBODIMENT

Figure 1:
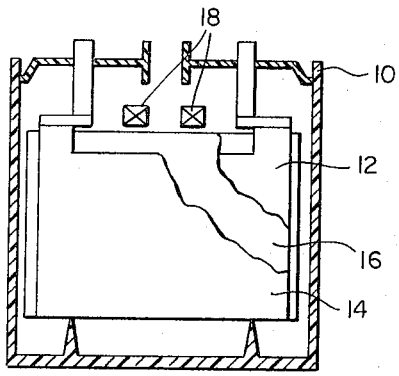
FIG. 1 illustrates the location of chemical radicals in a dry uncharged cell of the type described.

In FIG. 1, a cell container 10 contains positive battery plate, 12, negative plate, 14, and separators 16. For convenience, the assemblage of positive plates is termed the positive plate group and the assemblage of negative plates the negative plate group.

The cell as shown is dry (i.e., without electrolyte). The positive plates 12 and the negative plates 14 have been fully sulfated and dried during their processing as described above so that they contain for example, about 90 percent of the sulfate radical needed for a suitable electrolyte. The plates also contain a small amount of free acid, for example, about 0.4 percent of the total required sulfuric acid. To this cell is added sodium acid sulfate monohydrate in an amount equal to 9.6 percent of the total or 4.8 percent of the hydrogen ions required. The addition is made either in the form of powder or preferably as one or more pellets 18 placed at the top of the cell element. Table 1 indicates the general distribution of the electrolyte forming ingredients.

Figure 2:
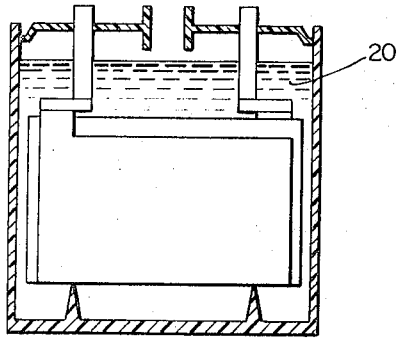
FIG. 2 illustrates the location of chemical radicals after the cell has been filled with water.

FIG. 2 and Table 2 depict the condition of the cell after it has been filled with water 20 but prior to charging. The sulfate salt has dissolved and any acid retained in the plates has diffused out to give an electrolyte having a specific gravity of about 1.080 due to principally the added salt.

Figure 3:
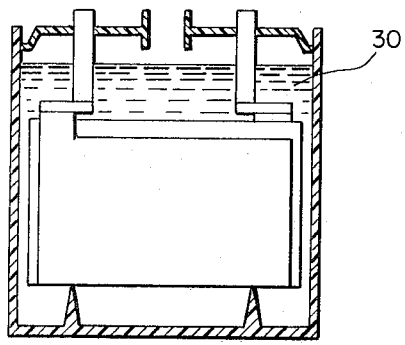
FIG. 3 illustrates the location of chemical radicals after filling and charging the cell.

In FIG. 3 and Table 3, the cell of FIG. 1 is shown in the fully charged state. The lead sulfate originally present in the battery plates has been converted to lead peroxide (positive plate) and lead sponge (negative plate). The sulfate ions liberated along with hydrogen ions set free from water molecules become sulfuric acid 30 and raise the specific gravity of the already slightly acidic electrolyte to any preselected level such as within the range of about 1.200 to about 1.300 specific gravity. Note that the alkali metal ions from the salt remain in the electrolyte.

Although it has been stated that the presence of alkali metal ions in a lead acid battery cell are not harmful in the sense of a poison, it is to be noted that they have a somewhat depressing effect on the cell behavior. This is because the mobility of the metallic ions is not as great as the mobility of the hydrogen ions which they replace, and consequently the electrical resistance of the electrolyte is greater when containing metallic ions than when the electrolyte is solely sulfuric acid of a similar sulfate ion content. This is not of great importance to a battery intended for low rate discharges but is important for batteries to be used for high rate discharges. Therefore, it is desirable to limit the amount of metal salt added to the cell to the amount only sufficient to prevent corrosive attack on the metal parts of the battery. In general, this is found to be within the limits of about 1 percent and 10 percent of the sulfate content or about 0.5 to about 5 percent of the hydrogen ion content of the electrolyte when the battery is fully charged.

EXAMPLE I

A dry storage battery cell having fully discharged and dried plates was assembled. The normal amount of acid required in this cell is 80 cc of 1.275 sp gr sulfuric acid solution. This amount of solution contains about 37 grams of sulfate ions. When this cell was filled with water and charged, it was observed that the cell voltage rapidly went to zero and upon examination a white corrosion product was found on the upper lead parts and signs of gray dendrite were seen penetrating the separators.

A second cell was prepared similar to the first. To this cell was added 5 gms sodium acid sulfate monohydrate in the form of a pressed pellet located on top of the cell element. This cell was filled with water and charged. The charge voltage of the cell rose in a normal manner to 2.65 volts (at full charge) and the cell was normal in every way. The pellet of sulfate salt contained about 3.5 grams sulfate ion or about 9.5 percent of the total sulfate ion needed in the cell. A third cell was prepared similar to the above two cells. To this cell was added a pellet of sodium acid sulfate weighing about 3 gms. This cell behaved in a way similar to the second cell. The pellet of sulfate contained about 2.1 grams sulfate ion or about 5.6 percent of the total sulfate ion needed in the cell.

EXAMPLE II

A fourth cell was prepared similar to the cells of Example I. To this cell was added 3 gms $KH_2PO_4$ (Potassium Dihydrogen Orthophosphate). The cell was filled with water and charged. The charge voltage rose in the normal manner to 2.58 volts at full charge and the cell was normal in every way as determined by charge-discharging testing.

A fifth cell was prepared similar to those noted above. To this cell was added 5 gms $KH_2PO_4$. The cell was filled with water and charged. The charge voltage rose to 2.55 at full charge and the cell was normal in every way.

Having thus fully described my invention and given examples of its application to the storage battery art, I now claim:

1. In a water activated lead acid storage battery cell including a container, a dry positive plate group and a dry negative plate group, wherein the positive plate group and the negative plate group are substantially fully discharged and contain a large portion of lead sulfate, the improvement which comprises: the inclusion of a soluble hydrogen ion producing salt within the cell container selected from the group consisting of the alkali metal acid sulfates, alkali metal acid sulfites and alkali metal hydrogen orthophosphates.

2. A storage battery cell as defined in claim 1 wherein the quantity of soluble hydrogen ion producing salt is sufficient to provide at least 1 percent of the total ions in the cell electrolyte when the cell is fully charged.

3. A storage battery cell as defined in claim 1 wherein the soluble hydrogen ion producing salt is sodium acid sulfate monohydrate.

4. A storage battery cell as defined in claim 1 wherein the soluble hydrogen ion producing salt is located above the positive and negative plate groups.

5. A storage battery cell as defined in claim 1 wherein the soluble hydrogen ion producing salt is in the form of at least one pressed pellet.

6. A storage battery as defined in claim 1 wherein the soluble hydrogen ion producing salt is sodium acid sulfate.

* * * * *